United States Patent
Guim Bernat et al.

(10) Patent No.: US 12,095,844 B2
(45) Date of Patent: Sep. 17, 2024

(54) METHODS AND APPARATUS FOR RE-USE OF A CONTAINER IN AN EDGE COMPUTING ENVIRONMENT

(71) Applicant: Intel Corporation, Santa Clara, CA (US)

(72) Inventors: Francesc Guim Bernat, Barcelona (ES); Brinda Ganesh, Portland, OR (US); Timothy Verrall, Pleasant Hill, CA (US); Ned Smith, Beaverton, OR (US); Kshitij Doshi, Tempe, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 828 days.

(21) Appl. No.: 17/069,809

(22) Filed: Oct. 13, 2020

(65) Prior Publication Data

US 2021/0044646 A1 Feb. 11, 2021

(51) Int. Cl.
H04L 67/02 (2022.01)
G06F 9/455 (2018.01)
H04L 67/1097 (2022.01)
H04L 67/5682 (2022.01)

(52) U.S. Cl.
CPC .......... *H04L 67/02* (2013.01); *G06F 9/45558* (2013.01); *H04L 67/1097* (2013.01); *H04L 67/5682* (2022.05); *G06F 2009/45562* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

2007/0220009 A1* 9/2007 Morris ................ G06F 21/6218
2011/0314155 A1* 12/2011 Narayanaswamy .. G06F 9/4856
709/226
2020/0084202 A1 3/2020 Smith et al.

FOREIGN PATENT DOCUMENTS

EP 3267323 1/2018

OTHER PUBLICATIONS

Xu Yanjun et al., "A Novel Method to Save and Reuse Virtual Computing Environment," International Conference on Computational and Information Sciences, IEEE, 2013, 4 pages.
European Patent Office, "European Search Report," issued in connection with European Patent Application No. 21188231.1, Feb. 2, 2022, 12 pages.

* cited by examiner

Primary Examiner — Clayton R Williams
(74) Attorney, Agent, or Firm — Hanley, Flight & Zimmerman, LLC

(57) ABSTRACT

Methods, apparatus, systems and articles of manufacture for re-use of a container in an edge computing environment are disclosed. An example method includes detecting that a container executed at an edge node of a cloud computing environment is to be cleaned, deleting user data from the container, the deletion of the user data performed without deleting the container from the memory of the edge node, restoring settings of the container to a default state; and storing information identifying the container, the information including a flavor of the container, the storing of the information to enable the container to be re-used by a subsequent requestor.

24 Claims, 13 Drawing Sheets

METHODS AND APPARATUS FOR RE-USE OF A CONTAINER IN AN EDGE COMPUTING ENVIRONMENT

FIELD OF THE DISCLOSURE

This disclosure relates generally to edge computing, and, more particularly, to methods and apparatus for re-use of a container in an edge computing environment.

BACKGROUND

In recent years, compute resources residing at network edges are expanding rapidly due to a need to support the rapid proliferation of devices that makeup the Internet of Things. The pooling of such resources is typically performed at the cloud level of the Internet but can also be performed at the edge level of the Internet.

Figure 1:
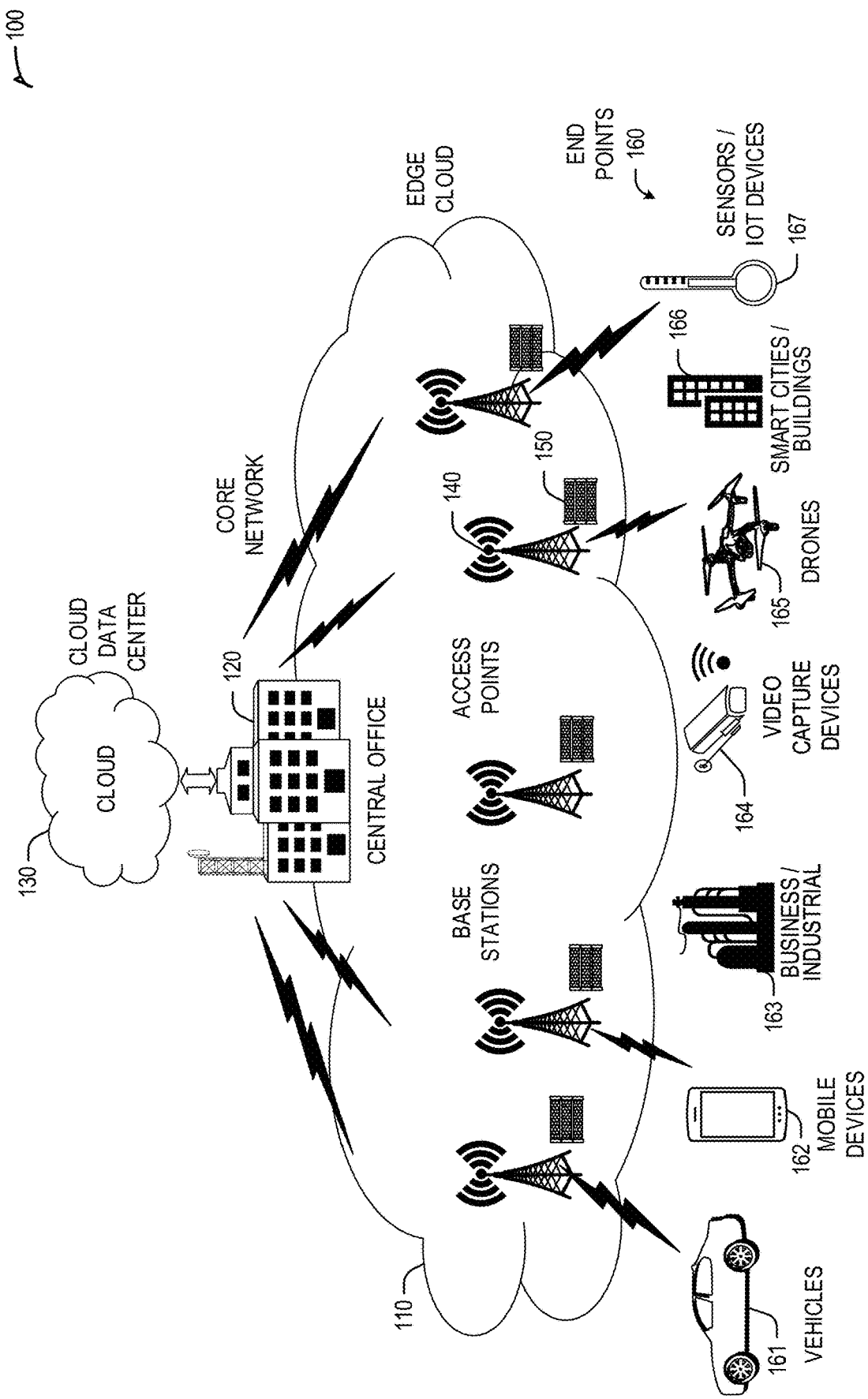
FIG. 1 illustrates an overview of an edge cloud configuration for edge computing.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Function as a service (FaaS) is seen as one of the potential solutions for both Edge and Cloud deployments to provide scalable and flexible architectures. Furthermore, the FaaS paradigm allows deployment of services using FFaaS; which is a different type of FaaS—namely Function Flavors as a Service (FFaaS) where function execution is seamlessly independent of the underlying hardware and system complexities while retaining the benefits of highly specialized function acceleration. FFaaS allows services to move to different locations and utilize different types of functions with different accelerator hardware regardless of the service type or implementation. In current deployments, functions are executed within a container to provide support in terms of libraries, resources, and/or abstractions that the function needs. This allows a scalable and/or portable solution. However, this type of architectures exhibit some challenges. For example, many requests for new containers with different type of requirements may come in parallel. Such a parallel arrival of requests for new containers result in creation and/or destruction of containers at that scale maybe prohibitive. Example approaches disclosed herein enable re-use of such containers, thereby reducing computation and/or resource overheads associated with creation and/or destruction of such containers FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data (e.g., at a "local edge", "close edge", or "near edge"). For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
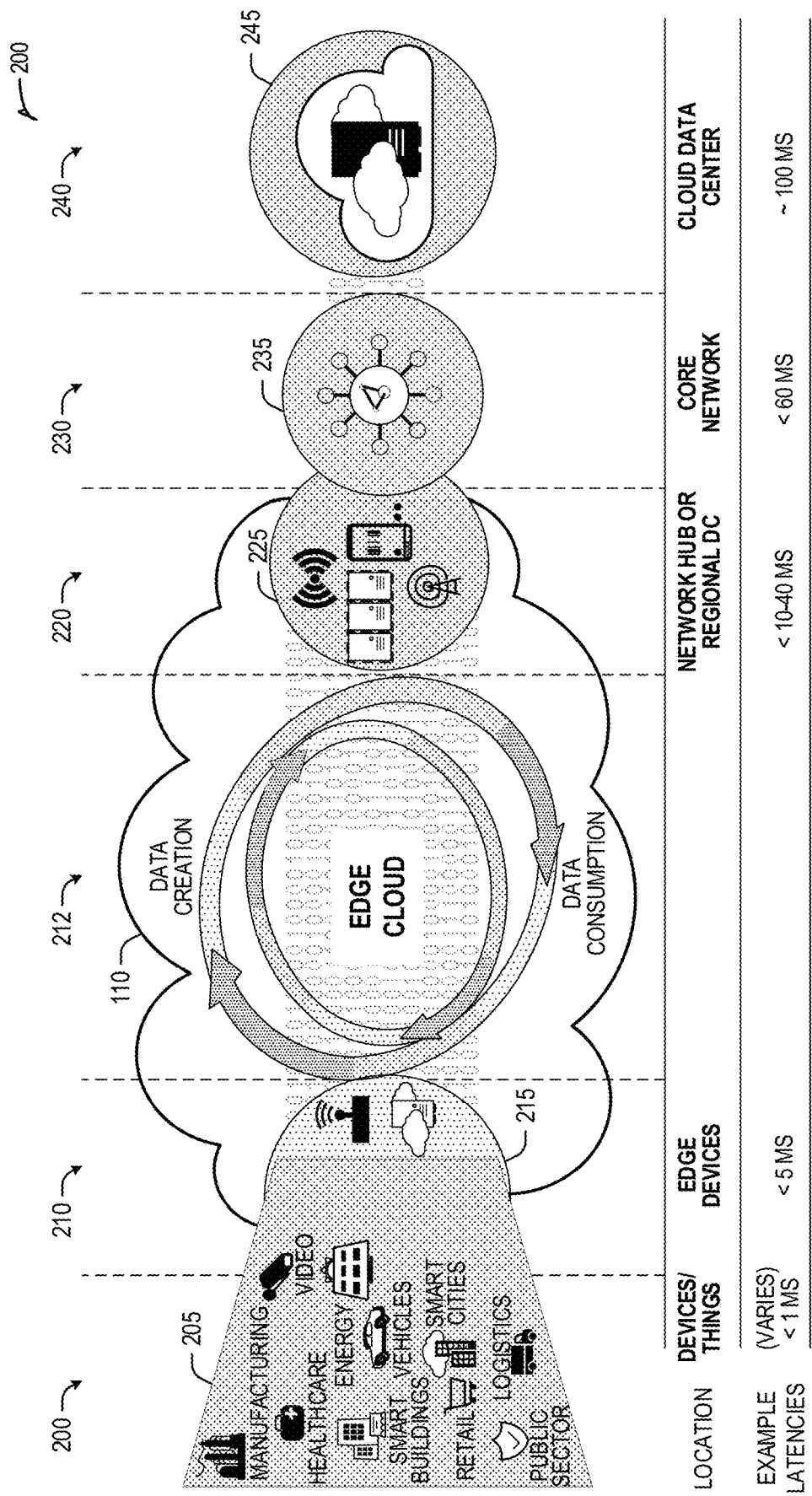
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240. The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 12. The edge cloud 110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
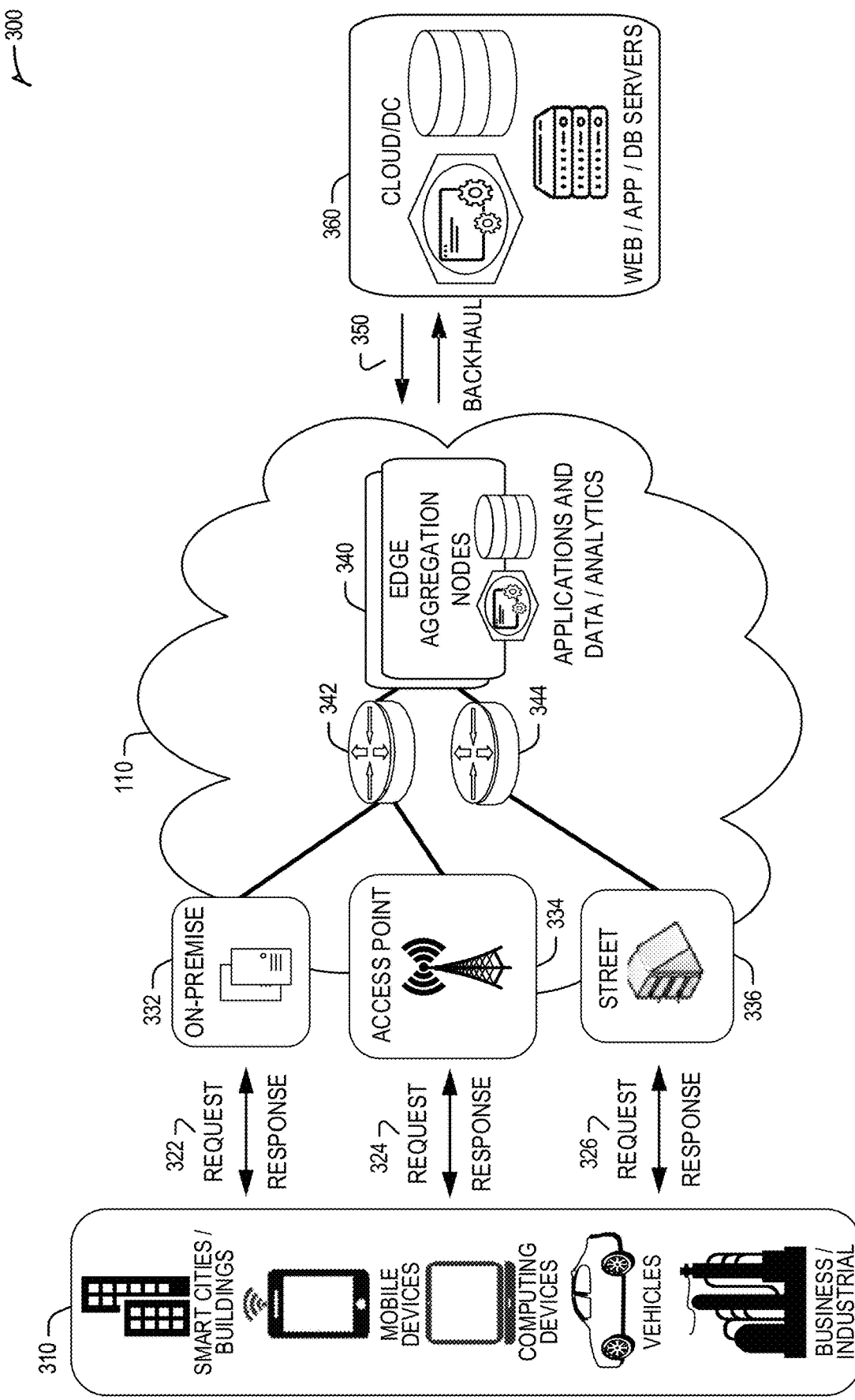
FIG. 3 illustrates a block diagram of an example environment for networking and services in an edge computing system.

FIG. 3 illustrates a block diagram of an example environment 300 in which various client endpoints 310 (in the form of mobile devices, computers, autonomous vehicles, business computing equipment, industrial processing equipment, etc.) exchange requests and responses with the example edge cloud 110. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
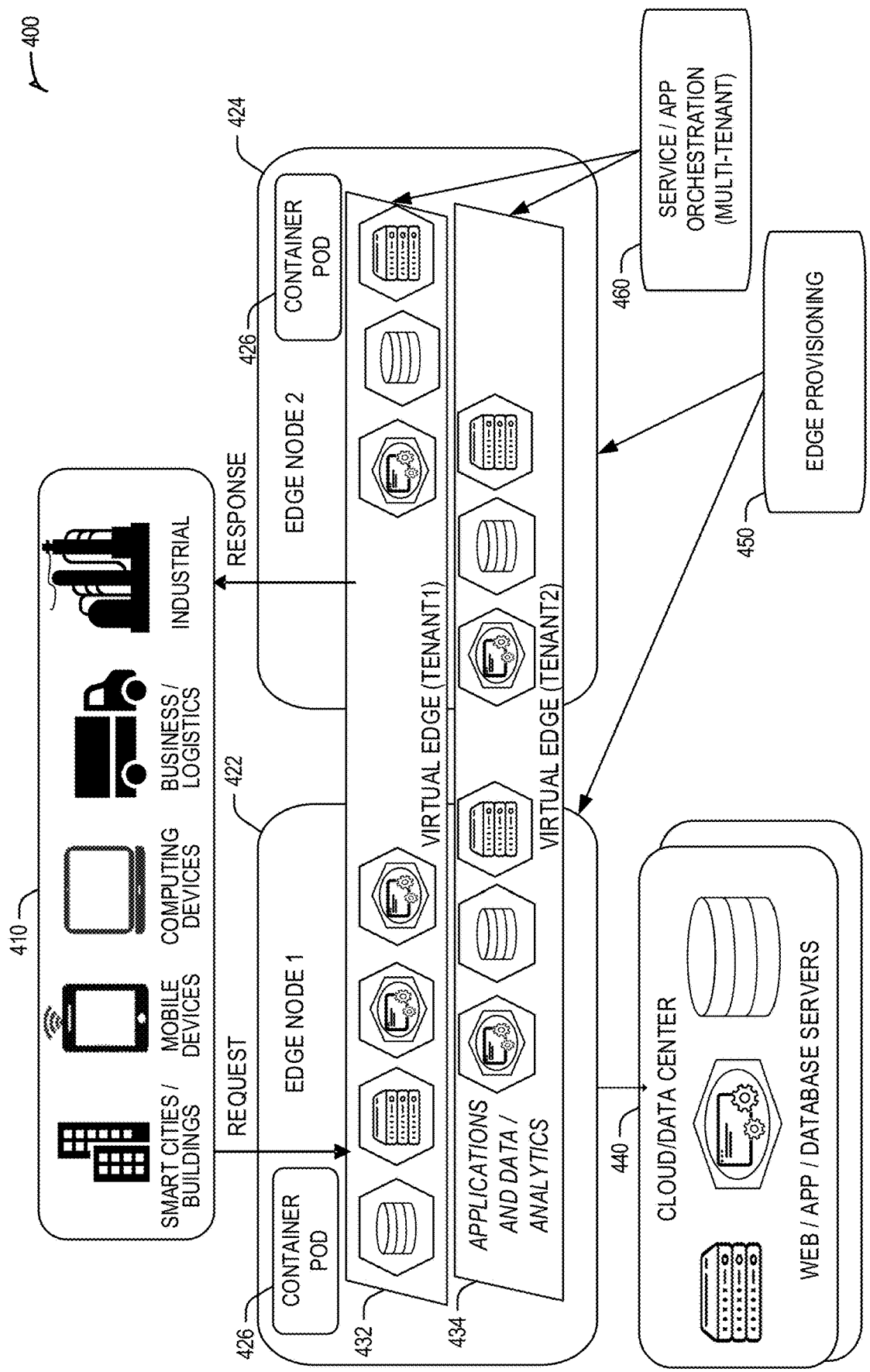
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices 410 are multi-tenant devices where Tenant 1 may function within a tenant1 'slice' while a Tenant 2 may function within a tenant2 'slice' (and, in further examples, additional or sub-tenants may exist; and each tenant may even be specifically entitled and transactionally tied to a specific set of features all the way day to specific hardware features). A trusted multi-tenant device may further contain a tenant-specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective devices 410, 422, and 440 spanning RoTs may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each of the edge nodes 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., the orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
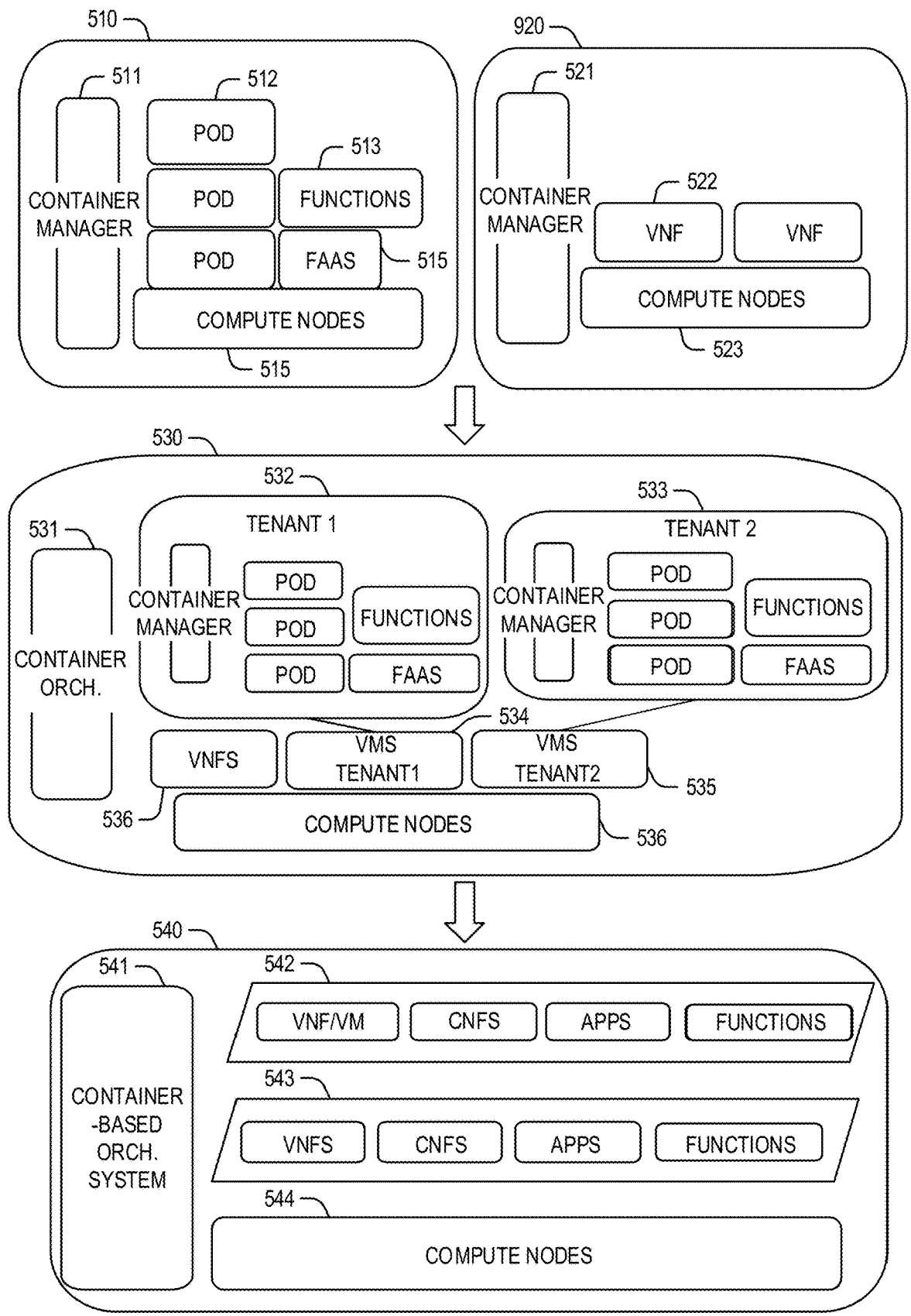
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and a container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in an example system arrangement 530 (using compute nodes 536), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
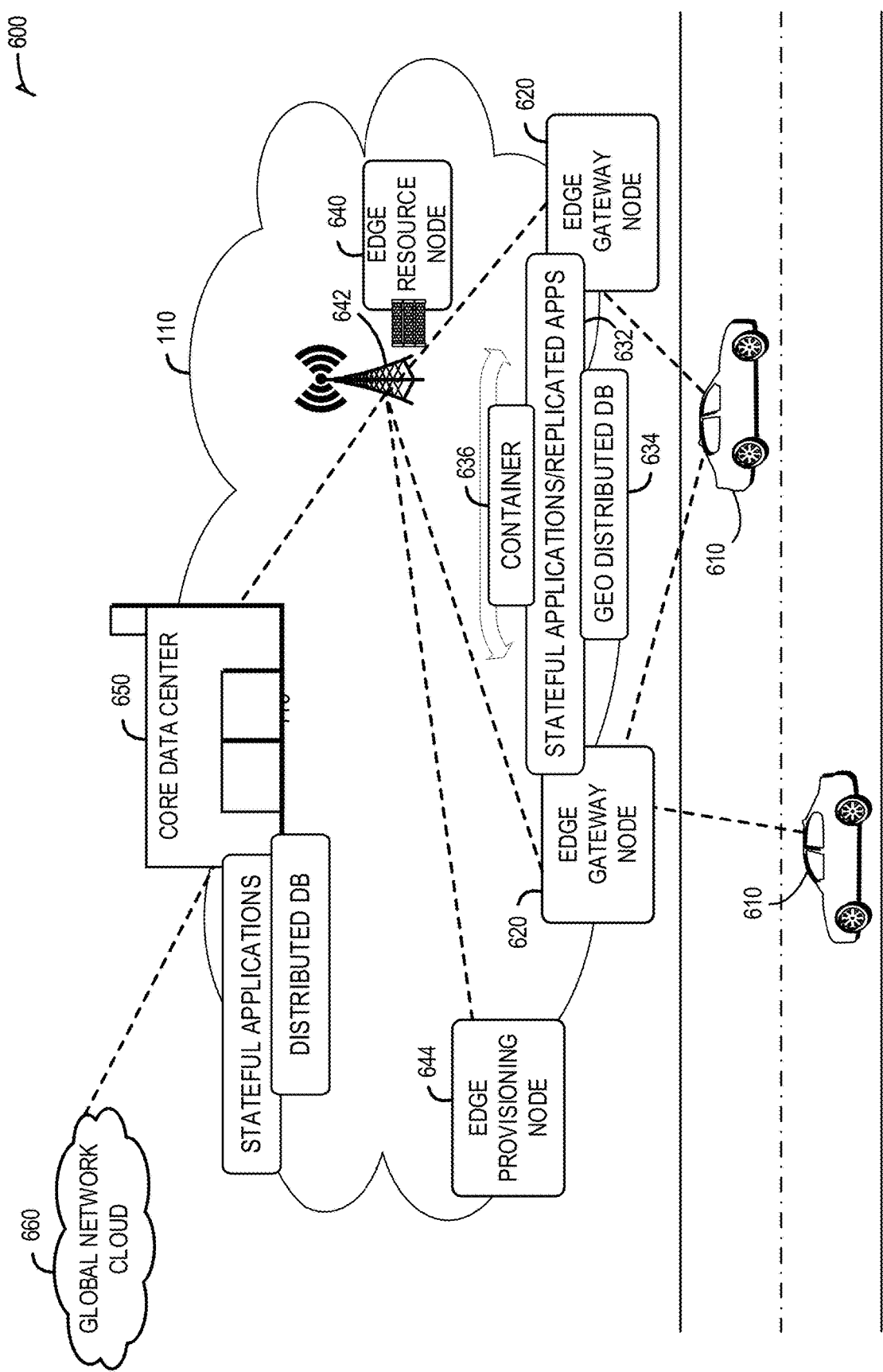
FIG. 6 illustrates an example compute and communication use case involving mobile access to applications in an example edge computing system.

It should be appreciated that the edge computing systems and arrangements discussed herein may be applicable in various solutions, services, and/or use cases involving mobility. As an example, FIG. 6 shows an example simplified vehicle compute and communication use case involving mobile access to applications in an example edge computing system 600 that implements an edge cloud such as the edge cloud 110 of FIG. 1. In this use case, respective client compute nodes 610 may be embodied as in-vehicle compute systems (e.g., in-vehicle navigation and/or infotainment systems) located in corresponding vehicles which communicate with example edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular one of the edge gateway nodes 620 may propagate so as to maintain a consistent connection and context for the example client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway nodes 620.

The edge gateway nodes 620 may communicate with one or more edge resource nodes 640, which are illustratively embodied as compute servers, appliances or components located at or in a communication base station 642 (e.g., a based station of a cellular network). As discussed above, the respective edge resource node(s) 640 include an amount of processing and storage capabilities and, as such, some processing and/or storage of data for the client compute nodes 610 may be performed on the edge resource node(s) 640. For example, the processing of data that is less urgent or important may be performed by the edge resource node(s) 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The example core data center 650 provides a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource node(s) 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource node(s) 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from one of the edge nodes 620 to other edge nodes (e.g., another one of edge nodes 620, one of the edge resource node(s) 640, etc.) such that the container with an application and workload does not need to be reconstituted, re-compiled, re-interpreted in order for migration to work. However, in such settings, there may be some remedial or "swizzling" translation operations applied. For example, the physical hardware at the edge resource node(s) 640 may differ from the hardware at the edge gateway nodes 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node(s) 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 1282 of FIG. 12, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 1282 of FIG. 12. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 1282 of FIG. 12, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 1282 from the edge provisioning node 644. For example, the software instructions, which may correspond to the example computer readable instructions 1282 of FIG. 12, may be downloaded to the example processor platform/s, which is to execute the computer readable instructions 1282 to implement the methods described herein.

In some examples, the processor platform(s) that execute the computer readable instructions 1282 can be physically located in different geographic locations, legal jurisdictions, etc. In some examples, one or more servers of the edge provisioning node 644 periodically offer, transmit, and/or force updates to the software instructions (e.g., the example computer readable instructions 1282 of FIG. 12) to ensure improvements, patches, updates, etc. are distributed and applied to the software instructions implemented at the end user devices. In some examples, different components of the computer readable instructions 1282 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 11 and/or 12. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7:
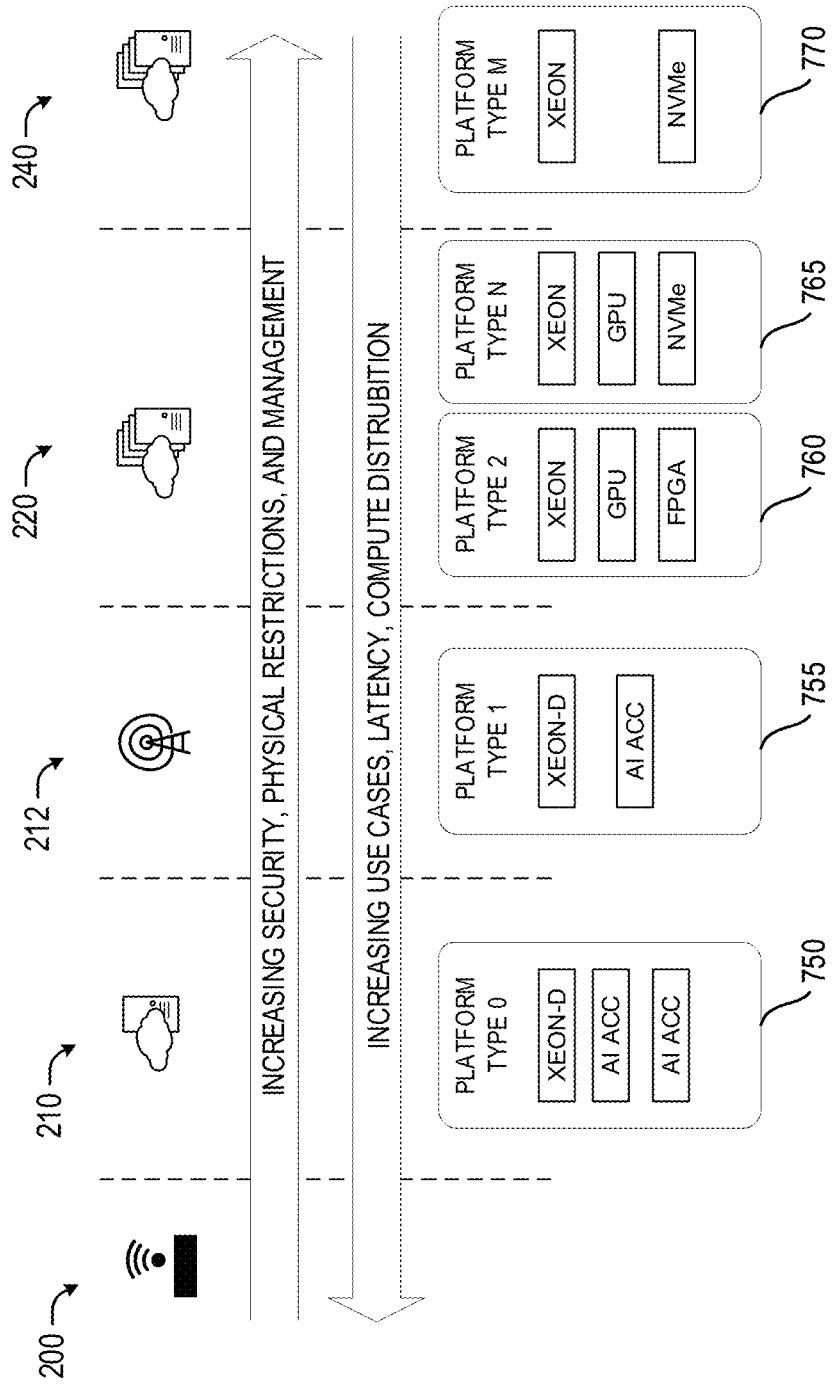
FIG. 7 is example challenges faced at different locations within an example edge computing system.

Orchestration in edge clouds differs from traditional data center clouds because of the need to balance between competing demands of keeping scheduling latencies low and predictable (e.g., for maintaining good response times) while achieving highest possible utilization of the limited asset pools. FIG. 7 illustrates example challenges faced at different locations within an example edge computing system. In the illustrated example of FIG. 7, devices that are disclosed above in connection with FIG. 2 are illustrated in a similar arrangement to the diagram of FIG. 2. In the illustrated example of FIG. 7, the device 200 is expected to utilize less than fifty watts of power, have a small form factor, utilize ambient cooling, have no physical surveillance, and be remotely managed. The example on-premise device 210 is expected to utilize approximately one hundred watts of power, have a rack unit form factor, utilize Network Equipment-Building Practice (NEBS) standard cooling, and be remotely managed. The example device 212 is expected to utilize less than six hundred watts of power, be implemented using a Pizza box (e.g., a blade) form factor, utilize NEBS cooling, not be under physical surveillance, and be remotely managed. The example node 220 is expected to utilize less than nine kilowatts of power per rack, be a rack-mounted form factor, utilize NEBS cooling, and be remotely managed. The example node 240 is expected to have standard data center capabilities and oversight.

The example node 200 is located at the edge, while the example node 240 is at the core of the example edge cloud. As devices are increasingly closer to the core, they tend to encounter increased security restrictions, physical restrictions, and/or management requirements. Conversely, as devices are increasingly closer to the edge, they tend to encounter increasing uses cases, increasing latency, and increasing compute distribution.

As illustrated in FIG. 7, edge assets vary in the communication radius and bandwidth. As a result, an orchestrator's view of resource utilizations and response times may lag reality (a challenge common to centralized orchestration approaches) but one whose consequences in edge clouds impact Service Level Agreements (SLAs) more seriously (e.g., due to low latency demands that must be met within tight resource constraints).

In some examples, different edge devices may be implemented using different hardware, software, and/or firmware configurations. In examples disclosed herein, different hardware, software, and/or firmware configurations of an edge node are referred to as a flavor. In the illustrated example of FIG. 7, five example flavors are illustrated. A first flavor 750 includes a Xeon-D processor and two AI accelerators. A second example flavor 755 includes a Xeon-D processor and an AI accelerator. A third example flavor 760 includes a Xeon processor, a GPU, and an FPGA. A fourth example flavor includes a Xeon processor, a GPU, and a non-volatile memory (NVMe). A fifth example flavor 770 includes a Xeon processor and an NVMe. While in the illustrated example of FIG. 7, five different flavors are shown, any number of example flavors having any past, present, and/or future combinations of hardware, software, and/or firmware may additionally or alternatively be used.

Video Analytics and other types of function-oriented workloads have become one of the more relevant Edge computing building blocks that spans multiple usage domains. Hospitals can use X-Ray or CT-Scan images to speed up patient diagnosis, while labs can use microscopy images to accelerate new drug discovery. In smart cities, object tracking for cars can help improve traffic flow. Likewise, face detection is used to improve safety, lower crime, and improve user experiences. Face detection objects are susceptible to being recognized and classified in more than 100 and 300 million new photos and videos that are uploaded every day to crime prevention info-bases, social media servers, and at airports (e.g., where airlines and/or security personnel desire to use facial recognition to speed up check-in, security, immigration, and boarding processes).

Function as a service (FaaS) is seen as one of the potential solutions for both Edge and Cloud deployments to provide scalable and flexible architectures. Furthermore, the FaaS paradigm allows deployment of services using FFaaS; which is a different type of FaaS—namely Function Flavors as a Service (FFaaS) where function execution is seamlessly independent of the underlying hardware and system complexities while retaining the benefits of highly specialized function acceleration. One of the main benefits of FFaaS is that it allows services to move to different locations and utilize different types of functions with different accelerator hardware regardless of the service type or implementation. For example, in a system with a surveillance service calling to a function doing person detection the architecture may execute the function corresponding to an accelerated hardware (e.g., Intel Movidius) or on a specialized processor (e.g., an Intel E3 Server with SGX support) depending on availability function execution profile requirements.

In current deployments, functions are executed within a container to provide support in terms of libraries, resources, and/or abstractions that the function needs. This allows a scalable and/or portable solution. However, this type of architectures exhibit some challenges. For example, many requests for new containers with different type of requirements may come in parallel. Such a parallel arrival of requests for new containers result in creation and/or destruction of containers at that scale maybe prohibitive. In some examples, re-use of containers maybe possible. However, with security being one of the top concerns in edge architectures, such re-use of containers must satisfy the different levels of security requirements.

Putting such requirements together in many of the use cases where low latency execution is a requirement makes the challenge more relevant. In examples disclosed herein, security flavors and performance flavors are defined as a part of the edge deployment. As defined herein, a flavor is a description of a typology of an edge function and/or service. A flavor may include specific performance and security requirements. In some examples, a flavor may identify additional features of a particular container including, for example, an operating system, a runtime environment, executables available within the container, etc. Each container, docker, and/or VM can be mapped into a particular flavor. Hence, the re-use is performed by finding an existing container or VM (if any) that maps to the required performance and security flavors.

As used herein, a security flavor includes a set of platform and/or container knobs that define how hardware and software resources must be configured for that flavor. As used herein, a performance flavor includes a set of platform and/or container knobs that define how hardware and software resources must be configured to for that flavor to archive the required level of performance.

Figure 8:
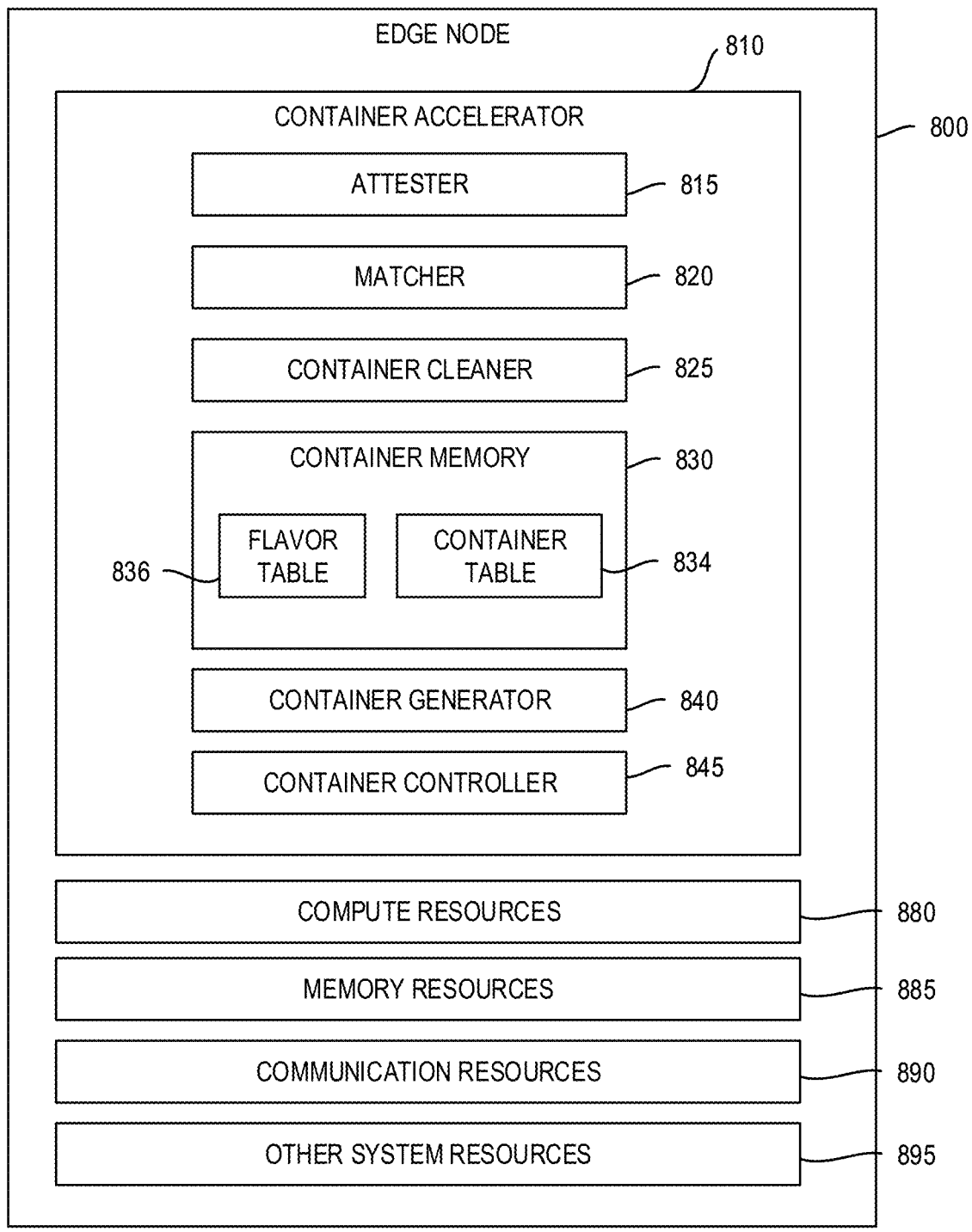
FIG. 8 is a block diagram illustrating an example implementation of an example edge node.

FIG. 8 is a block diagram illustrating an example implementation of an example edge node 800. The example edge node 800 of the illustrated example of FIG. 8 includes a container accelerator 810, compute resources 880, memory resources 885, communication resources 890, and other system resources 895. The example container accelerator 810 includes an attester 815, a matcher 820, a container cleaner 825, container memory 830, a container generator 840, and a container controller 845. The example container memory 830 stores a container table 834, and a flavor table 836.

The example of attester 815 of the illustrated example of FIG. 8 attests to an identity of a container, as well as attests to the data stored in the container. In examples disclosed herein, to attest to the identity of the container, the example attester 815 generates a proof of identify and a timestamp, hashes the identity and the timestamp, signs the hash, and sends the signed has to a validation entity (e.g., a trusted server) to be validated. The signed response is stored, and is exposed to the requestor to validate the status of the container. In this manner, the attester 815 attests to the identity of the container. Similar to generating the proof of identity, to attest to the data stored in the container, the example attester 815 generates a hash (e.g., a signature) of the data objects stored in the container, and provides the hash to the validation entity (e.g., a trusted server) to be validated.

The example matcher 820 of the illustrated example of FIG. 8, in response to a request to access a container received via the example container controller 845 (which identifies a requested flavor), determines whether any container of the requested flavor is available. In examples disclosed herein, the example matcher 820 determines whether the container of the requested flavor is available by identifying whether any containers use the requested flavor as identified in the container table 834 of the container memory 830, and by determining if such a container is not already in use.

The example container cleaner 825 of the illustrated example of FIG. 8 removes user data from a container after it is determined that the container is to be cleaned. In examples disclosed herein, user data is defined to be any data that is not identified within the list of data objects that are to be kept within the container. The list of data objects that are to be kept within the container may include for example, libraries, executables, configuration files, and/or any other data that is expected to be included in the container. In this manner, the example container cleaner 825 deletes any data which is not identified in the list of data objects. In some examples, the example container cleaner 825 restores any settings (e.g., with respect to the performance and/or security knobs associated with the container) that a prior execution of the container may have modified. In this manner, a new software stack that will land on that container (e.g., as a result of subsequent access to the container) can perform the attestation of a container (do new hash) and validate that the container is the one that is requested.

The example container memory 830 of the illustrated example of FIG. 8 is implemented by any memory, storage device and/or storage disc for storing data such as, for example, flash memory, magnetic media, optical media, solid state memory, solid state disk (SSD) drive (SSDD), hard drive(s), thumb drive(s), etc. Furthermore, the data stored in the example container memory 830 may be in any data format such as, for example, binary data, comma delimited data, tab delimited data, structured query language (SQL) structures, etc. While, in the illustrated example, the container memory 830 is illustrated as a single device, the example container memory 830 and/or any other data storage devices described herein may be implemented by any number and/or type(s) of memories. In the illustrated example of FIG. 8, the example container memory 830 stores the example container table 834 and the example flavor table 836. While in examples disclosed herein the container table 834 and the example flavor table 836 are described as being data structures implemented as tables, any other past, present, and/or future type of data structure(s) may additionally or alternatively be used to store and/or otherwise organize the data stored in the example container table 834 and/or the example flavor table.

In examples disclosed herein, the example container table 834 includes data that identifies, for example, an ID for each respective container executed by the example edge node 800, meta-data for those containers (e.g., which may include data related to process Ids of the container, memory addresses, volumes, exposed devices etc.), a list of memory objects that are to be kept in each respective container and not removed upon cleanup, and a flavor identifier for each respective container. The example flavor table 836 stores information associated with each flavor type used by the edge device 800 including, for example, a flavor ID, a list of security knobs (e.g., parameters and/or settings), a list of performance knobs (e.g., parameters and/or settings). In examples disclosed herein, the knobs (e.g., the security knobs and/or the performance knobs) represent hardware and/or software settings and/or parameters that may be modified within the context of the flavor. During operation of a container, such knobs may be adjusted. As such, in some examples, the list of security knobs and/or the list of performance knobs includes default settings for the respective knobs such that the knobs can be returned to their default state during cleaning.

The example container generator 840 of the illustrated example of FIG. 8 generates an instance of a container at the example edge device 800. The container may be generated based on, for example, instructions and/or data received from another edge device (e.g., a server, a network data repository, etc.).

The example container controller 845 of the illustrated example of FIG. 8 controls container operations of the container accelerator 810. The example container controller 845 determines when to clean a container. In examples disclosed herein, the example container controller 845 determines that a container is to be cleaned in response to, for example receiving a message requesting the cleaning of a container and/or a message indicating that use of the container is complete. Alternatively, the example container controller 845 may determine that a container is to be cleaned in response to a threshold amount of time elapsing since the container was last used. In this manner, un-used containers can be cleaned and their resources readied for future container operations.

The example container controller 845 additionally controls access to cleaned containers. In examples disclosed herein, the example container controller 845 receives an access request that requests access to a container. In examples disclosed herein, the access request includes an identification of the flavor of the requested container, as well as information identifying whether attestation of the container is required, and/or whether attestation of the data present in the container is required.

The example compute resources 880, the example memory resources 885, the example communication resources 890, and/or the other system resources 895 represent resources of the edge node 800. Different edge nodes may, for example, have different amounts and/or types of resources included therein and/or otherwise available to the edge node 800. In some examples, the container accelerator 810 is implemented using the example compute resources 880, the example memory resources 885, the example communication resources 890, and/or the other system resources 895.

In some examples, the attester 815 implements means for attesting. In some examples, the matcher 820 implements means for matching. In some examples, the container cleaner 825 implements means for cleaning. In some examples, the container generator 840 implements means for generating. In some examples, the container controller 845 implements means for detecting. In some alternative examples, the container controller 845 may implement means for controlling.

While an example manner of implementing the example edge node 800 is illustrated in FIG. 8, one or more of the elements, processes and/or devices illustrated in FIG. 8 may be combined, divided, re-arranged, omitted, eliminated and/or implemented in any other way. Further, the example attester 815, the example matcher 820, the example container cleaner 825, the example container generator 840, the example container controller 845, and/or, more generally, the example container accelerator 810 of FIG. 8 may be implemented by hardware, software, firmware and/or any combination of hardware, software and/or firmware. Thus, for example, any of the example attester 815, the example matcher 820, the example container cleaner 825, the example container generator 840, the example container controller 845, and/or, more generally, the example container accelerator 810 of FIG. 8 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example attester 815, the example matcher 820, the example container cleaner 825, the example container generator 840, the example container controller 845, and/or, more generally, the example container accelerator 810 of FIG. 8 is/are hereby expressly defined to include a non-transitory computer readable storage device or storage disk such as a memory, a digital versatile disk (DVD), a compact disk (CD), a Blu-ray disk, etc. including the software and/or firmware. Further still, the example edge node 800 of FIG. 8 may include one or more elements, processes and/or devices in addition to, or instead of, those illustrated in FIG. 8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
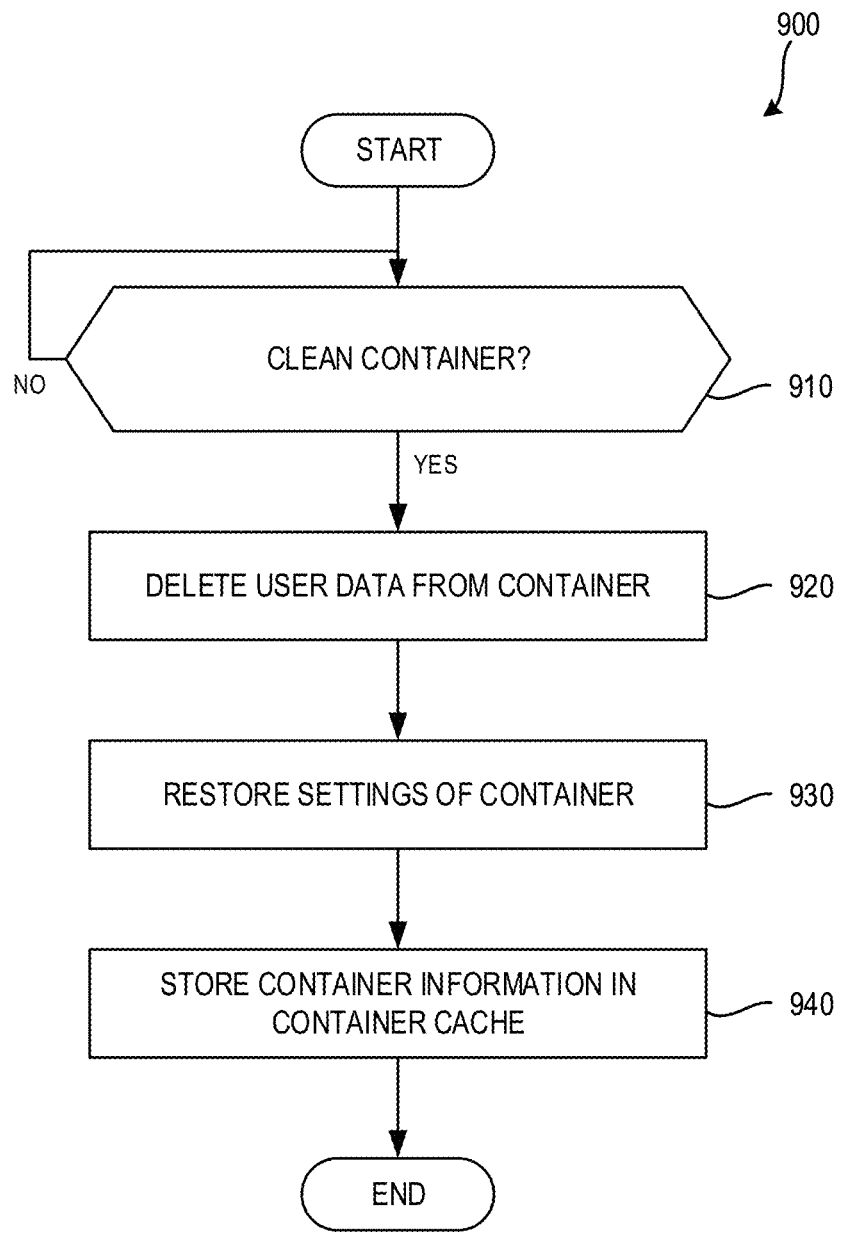
FIG. 9 is a flowchart representative of example machine readable instructions that may be executed to implement the example edge node of FIG. 8.

Flowcharts representative of example hardware logic, machine readable instructions, hardware implemented state machines, and/or any combination thereof for implementing the edge node 800 of FIG. 8 are shown in FIGS. 9 and/or 10. The machine readable instructions may be one or more executable programs or portion(s) of an executable program for execution by a computer processor and/or processor circuitry, such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9 and/or 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a solid state disk (SSD) drive (SSDD), a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions 900 that may be executed to implement the example edge node of FIG. 8. The example instructions 900 of the illustrated example of FIG. 9 begin when the example container controller 845 determines that a container is to be cleaned. (Block 910). The example container controller 845 may determine that a container is to be cleaned in response to, for example receiving a message requesting the cleaning of a container. Alternatively, the example container controller 845 may determine that a container is to be cleaned in response to a threshold amount of time elapsing since the container was last used. In this manner, un-used containers can be cleaned and their resources readied for future container operations.

Upon determining that the container is to be cleaned, the example container cleaner 825 removes user data from the container. (Block 920). In examples disclosed herein, user data is defined to be any data that is not identified within the list of data objects that are to be kept within the container. The list of data objects that are to be kept within the container may include for example, libraries, executables, configuration files, and/or any other data that is expected to be included in the container. In this manner, the example container cleaner 825 deletes any data which is not identified in the list of data objects. The example container cleaner 825 does not, however, delete the entirety of the container. That is, the container to be cleaned remains within the edge node, but in a cleaned state.

The example container cleaner 825 restores any settings (e.g., with respect to the performance and/or security knobs associated with the container) that a prior execution of the container may have modified. (Block 930). The example container controller 845 then stores the container information in the container memory 830. (Block 940). For example, the container controller 845 stores information identifying the flavor of the container, metadata concerning the container, the list of data objects, and an identifier of the container in the container table 834 of the example container memory 830. The example container controller 845 stores information identifying security knobs and/or performance knobs associated with the identified flavor, information identifying whether attestation of the container is required before re-use is allowed, information identifying whether the data remaining in the container must be attested to before container re-use is allowed, an identifier of the flavor, etc. The example process 900 of the illustrated example of FIG. 9 then terminates, but may be re-executed upon, for example, a determination that a container is to be cleaned.

Figure 10:
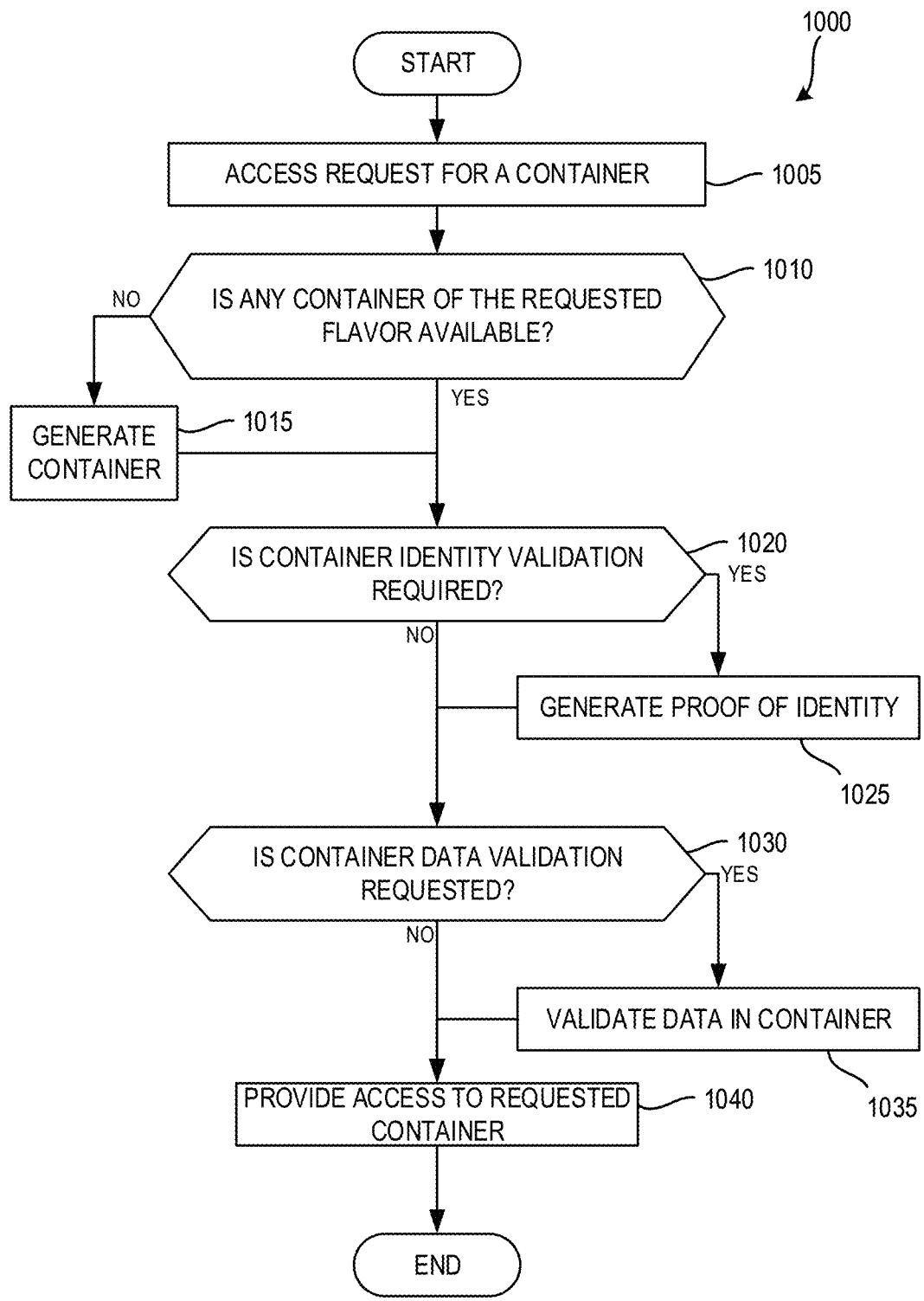
FIG. 10 is a flowchart representative of example machine readable instructions that may be executed to implement the example edge node of FIG. 8.

FIG. 10 is a flowchart representative of example machine readable instructions 1000 that may be executed to implement the example edge node of FIG. 8. The example process 1000 of the illustrated example of FIG. 10 begins when the example container controller 845 accesses (e.g., receives) a request to allocate a container for use. (Block 1005). In examples disclosed herein, the request for allocation of a container identifies the requested flavor of the container. The example matcher 820 determines whether any container of the requested flavor is available. (Block 1010). In examples disclosed herein, the example matcher 820 determines whether the container of the requested flavor is available by identifying whether any containers use the requested flavor as identified in the container table 834 of the container memory 830, and by determining if such a container is not already in use. If the container of the requested flavor is not available (e.g., block 1010 returns a result of NO), the example container generator 840 generates the identified container of the requested flavor. (Block 1015). After generation of the container (e.g., after block 1015), control may proceed to block 1020, where validation of the container and/or data stored therein is performed; or, alternatively, control may proceed directly to block 1040, where access to the requested container is granted.

Upon determining that the container of the requested flavor is available (e.g., block 1010 returning a result of YES), the example container controller 845 determines whether container identify validation is required, based on the request for access to the container. (Block 1020). In this manner, if the request demands to validate the container (e.g., if block 1020 returns a result of YES), the example attester 815 generates a proof of identify and a timestamp, hashes the identity and the timestamp, signs the hash, and sends the signed has to a validation entity (e.g., a trusted server) to be validated. (Block 1025). The signed response is stored, and is exposed to the requestor to validate the status of the container. In this manner, the attester 815 attests to the identity of the container.

The example container controller 845 determines whether validation of the data within the container is required, based on the request for access to the container. (Block 1030). In this manner, if the request demands validation of the data stored in the container (e.g., if block 1030 returns a result of YES), the example attester 815 validates the data stored in the container. (Block 1035). In examples disclosed herein, the example attester 815 validates the data based on the list of data objects that are to be stored in the container. Similar to generating the proof of identity, the example attester generates a hash (e.g., a signature) of the data objects stored in the container, and provides the hash to the validation entity (e.g., a trusted server) to be validated. In this manner, the attester 815 attests to the data stored in the container.

The example container controller 845, then provides access to the container. (Block 1040). The process of FIG. 10 then terminates, but may be repeated upon, for example, a subsequent request for access to a container. In this manner, a previously used container may be cleaned and later re-used. Such re-use reduces the need for containers to be completely deleted and then re-created upon subsequent use. Avoidance of the overhead associated with deleting and re-creating containers accelerates the use of such containers.

While in the illustrated example of FIGS. 9 and/or 10, the attestation of the container is performed in response to a request to access the container, in some examples, the attestation of the container may be performed in connection with the cleaning of the container. For example, after the container is cleaned (e.g., after block 930), the attester 815 may validate the identity of the container and/or the data stored in the container. In this manner, attestation of the container might not need to be performed in response to receipt of the request for access to the container. Performing such attestation at the time of cleaning may, for example, reduce the amount of time between receipt of the request to access the container (e.g., at block 1005) and providing of access to the requested container (e.g., at block 1040). However, in such an example, a potentially significant amount of time may elapse between the cleaning of the container and the subsequent request to access the container. In such an example, the attestation of the container may become stale and/or expired. Thus, in some examples, attestation may be performed again in response to receipt of the request for access to the container (e.g., if prior attestation data is expired).

Figure 11:
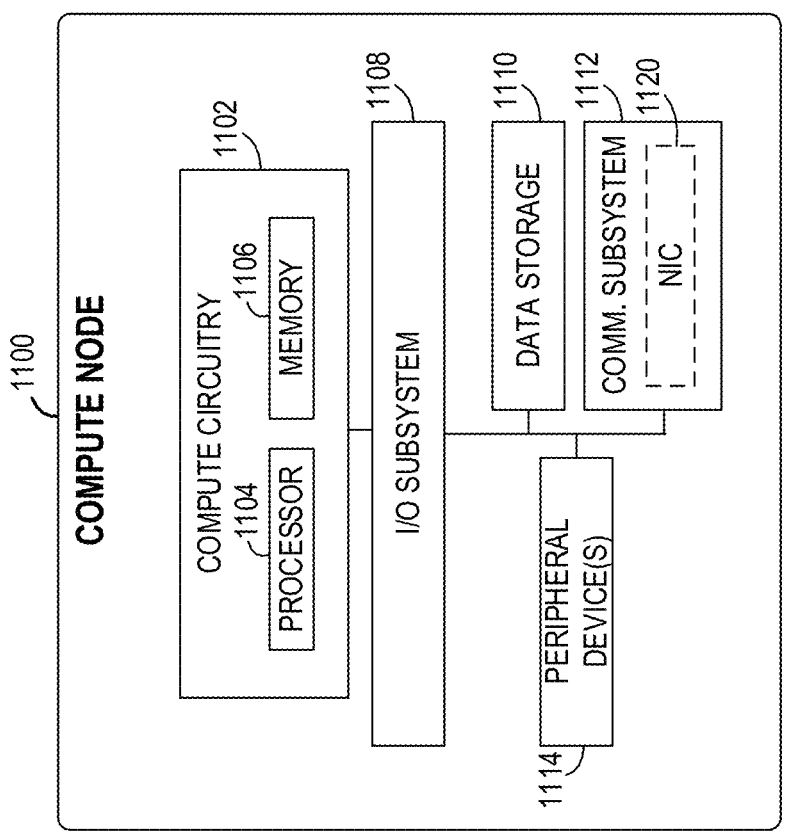
FIG. 11 is a block diagram of an example implementation of an example compute node that may be deployed in one of the edge computing systems illustrated in FIGS. 1-4 and/or 6.

In the simplified example depicted in FIG. 11 is a block diagram of an example implementation of, an example edge compute node 1100 that includes a compute engine (also referred to herein as "compute circuitry") 1102, an input/output (I/O) subsystem 1108, data storage 1110, a communication circuitry subsystem 1112, and, optionally, one or more peripheral devices 1114. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component. The example edge compute node 1100 of FIG. 11 may be deployed in one of the edge computing systems illustrated in FIGS. 1-4, 6, and/or 8 to implement any edge compute node of FIGS. 1-4, 6, and/or 8.

The compute node 1100 may be embodied as any type of engine, device, or collection of devices capable of performing various compute functions. In some examples, the compute node 1100 may be embodied as a single device such as an integrated circuit, an embedded system, a field-programmable gate array (FPGA), a system-on-a-chip (SOC), or other integrated system or device. In the illustrative example, the compute node 1100 includes or is embodied as a processor 1104 and a memory 1106. The processor 1104 may be embodied as any type of processor capable of performing the functions described herein (e.g., executing an application). For example, the processor 1104 may be embodied as a multi-core processor(s), a microcontroller, a processing unit, a specialized or special purpose processing unit, or other processor or processing/controlling circuit.

In some examples, the processor 1104 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1104 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1104 may work in coordination with each other to execute many types of operations and instructions within and on behalf of the compute node 1100.

The memory 1106 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1106 may be integrated into the processor 1104. The memory 1106 may store various software and data used during operation such as one or more applications, data operated on by the application(s), libraries, and drivers.

The compute circuitry 1102 is communicatively coupled to other components of the compute node 1100 via the I/O subsystem 1108, which may be embodied as circuitry and/or components to facilitate input/output operations with the compute circuitry 1102 (e.g., with the processor 1104 and/or the main memory 1106) and other components of the compute circuitry 1102. For example, the I/O subsystem 1108 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1108 may form a portion of a system-on-a-chip (SoC) and be incorporated, along with one or more of the processor 1104, the memory 1106, and other components of the compute circuitry 1102, into the compute circuitry 1102.

The one or more illustrative data storage devices 1110 may be embodied as any type of devices configured for short-term or long-term storage of data such as, for example, memory devices and circuits, memory cards, hard disk drives, solid-state drives, or other data storage devices. Individual data storage devices 1110 may include a system partition that stores data and firmware code for the data storage device 1110. Individual data storage devices 1110 may also include one or more operating system partitions that store data files and executables for operating systems depending on, for example, the type of compute node 1100.

The communication circuitry 1112 may be embodied as any communication circuit, device, or collection thereof, capable of enabling communications over a network between the compute circuitry 1102 and another compute device (e.g., an edge gateway of an implementing edge computing system). The communication circuitry 1112 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1112 includes a network interface controller (NIC) 1120, which may also be referred to as a host fabric interface (HFI). The NIC 1120 may be embodied as one or more add-in-boards, daughter cards, network interface cards, controller chips, chipsets, or other devices that may be used by the compute node 1100 to connect with another compute device (e.g., an edge gateway node). In some examples, the NIC 1120 may be embodied as part of a system-on-a-chip (SoC) that includes one or more processors, or included on a multichip package that also contains one or more processors. In some examples, the NIC 1120 may include a local processor (not shown) and/or a local memory (not shown) that are both local to the MC 1120. In such examples, the local processor of the NIC 1120 may be capable of performing one or more of the functions of the compute circuitry 1102 described herein. Additionally, or alternatively, in such examples, the local memory of the NIC 1120 may be integrated into one or more components of the client compute node at the board level, socket level, chip level, and/or other levels.

Additionally, in some examples, a respective compute node 1100 may include one or more peripheral devices 1114. Such peripheral devices 1114 may include any type of peripheral device found in a compute device or server such as audio input devices, a display, other input/output devices, interface devices, and/or other peripheral devices, depending on the particular type of the compute node 1100. In further examples, the compute node 1100 may be embodied by a respective edge compute node (whether a client, gateway, or aggregation node) in an edge computing system or like forms of appliances, computers, subsystems, circuitry, or other components.

Figure 12:
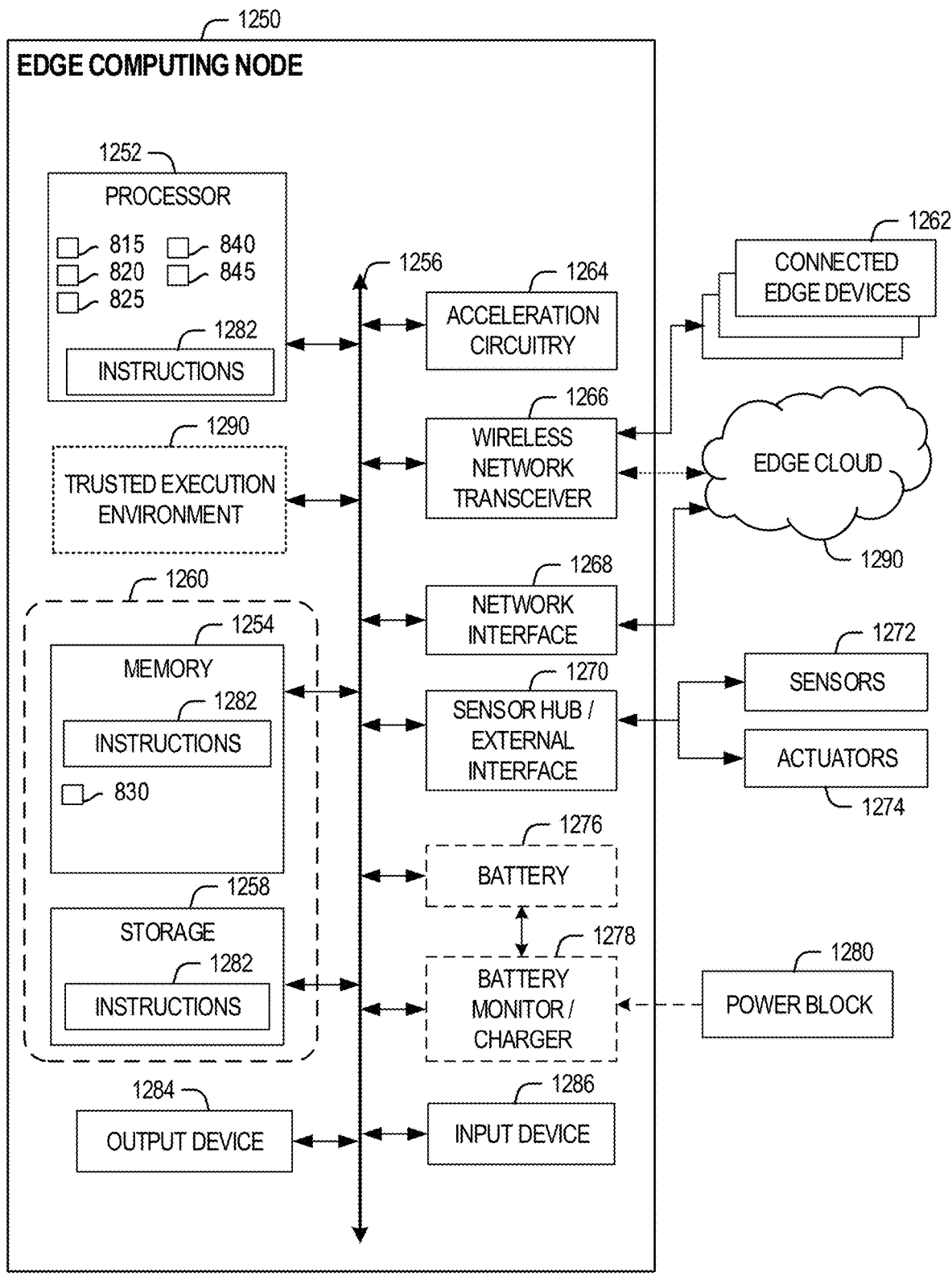
FIG. 12 is another block diagram of an example implementation of the example edge node of FIG. 8 that may execute the instructions of FIGS. 9 and/or 10 to implement the example edge node 800 of FIG. 8 and that may be deployed in one of the edge computing systems illustrated in FIGS. 1-4 and/or 6.

In a more detailed example, FIG. 12 illustrates a block diagram of an example may edge computing node 1250 structured to execute the instructions of FIGS. 9 and/or 10 to implement the techniques (e.g., operations, processes, methods, and methodologies) described herein such as the edge node 800 of FIG. 8. This edge computing node 1250 provides a closer view of the respective components of node 1500 when implemented as or as part of a computing device (e.g., as a mobile device, a base station, server, gateway, etc.). The edge computing node 1250 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 1250, or as components otherwise incorporated within a chassis of a larger system. For example, the edge computing node 1250 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, an Internet of Things (IoT) device, or any other type of computing device.

The edge computing device 1250 may include processing circuitry in the form of a processor 1252, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1252 may be a part of a system on a chip (SoC) in which the processor 1252 and other components are formed into a single integrated circuit, or a single package, such as the Edison™ or Galileo™ SoC boards from Intel Corporation, Santa Clara, California. As an example, the processor 1252 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1252 and accompanying circuitry may be provided in a single socket form factor, multiple socket form factor, or a variety of other formats, including in limited hardware configurations or configurations that include fewer than all elements shown in FIG. 12. In this example, the processor implements the example container accelerator 810.

The processor 1252 may communicate with a system memory 1254 over an interconnect 1256 (e.g., a bus). Any number of memory devices may be used to provide for a given amount of system memory. As examples, the memory 1254 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1258 may also couple to the processor 1252 via the interconnect 1256. In an example, the storage 1258 may be implemented via a solid-state disk (SSD) drive (SSDD). Other devices that may be used for the storage 1258 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1258 may be on-die memory or registers associated with the processor 1252. However, in some examples, the storage 1258 may be implemented using a micro hard disk drive (HDD). Further, any number of new technologies may be used for the storage 1258 in addition to, or instead of, the technologies described, such resistance change memories, phase change memories, holographic memories, or chemical memories, among others.

The components may communicate over the interconnect 1256. The interconnect 1256 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1256 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1256 may couple the processor 1252 to a transceiver 1266, for communications with the connected edge devices 1262. The transceiver 1266 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1262. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1266 (or multiple transceivers) may communicate using multiple standards or radios for communications at a different range. For example, the edge computing node 1250 may communicate with close devices, e.g., within about 10 meters, using a local transceiver based on Bluetooth Low Energy (BLE), or another low power radio, to save power. More distant connected edge devices 1262, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1266 (e.g., a radio transceiver) may be included to communicate with devices or services in the edge cloud 1295 via local or wide area network protocols. The wireless network transceiver 1266 may be a low-power wide-area (LPWA) transceiver that follows the IEEE 802.15.4, or IEEE 802.15.4g standards, among others. The edge computing node 1250 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1266, as described herein. For example, the transceiver 1266 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1266 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1268 may be included to provide a wired communication to nodes of the edge cloud 1295 or to other devices, such as the connected edge devices 1262 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1268 may be included to enable connecting to a second network, for example, a first NIC 1268 providing communications to the cloud over Ethernet, and a second NIC 1268 providing communications to other devices over another type of network.

Given the variety of types of applicable communications from the device to another component or network, applicable communications circuitry used by the device may include or be embodied by any one or more of components 1264, 1266, 1268, or 1270. Accordingly, in various examples, applicable means for communicating (e.g., receiving, transmitting, etc.) may be embodied by such communications circuitry.

The edge computing node 1250 may include or be coupled to acceleration circuitry 1264, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1256 may couple the processor 1252 to a sensor hub or external interface 1270 that is used to connect additional devices or subsystems. The devices may include sensors 1272, such as accelerometers, level sensors, flow sensors, optical light sensors, camera sensors, temperature sensors, global navigation system (e.g., GPS) sensors, pressure sensors, barometric pressure sensors, and the like. The hub or interface 1270 further may be used to connect the edge computing node 1250 to actuators 1274, such as power switches, valve actuators, an audible sound generator, a visual warning device, and the like.

In some optional examples, various input/output (I/O) devices may be present within or connected to, the edge computing node 1250. For example, a display or other output device 1284 may be included to show information, such as sensor readings or actuator position. An input device 1286, such as a touch screen or keypad may be included to accept input. An output device 1284 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 1250. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1276 may power the edge computing node 1250, although, in examples in which the edge computing node 1250 is mounted in a fixed location, it may have a power supply coupled to an electrical grid, or the battery may be used as a backup or for temporary capabilities. The battery 1276 may be a lithium ion battery, or a metal-air battery, such as a zinc-air battery, an aluminum-air battery, a lithium-air battery, and the like.

A battery monitor/charger 1278 may be included in the edge computing node 1250 to track the state of charge (SoCh) of the battery 1276, if included. The battery monitor/charger 1278 may be used to monitor other parameters of the battery 1276 to provide failure predictions, such as the state of health (SoH) and the state of function (SoF) of the battery 1276. The battery monitor/charger 1278 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1278 may communicate the information on the battery 1276 to the processor 1252 over the interconnect 1256. The battery monitor/charger 1278 may also include an analog-to-digital (ADC) converter that enables the processor 1252 to directly monitor the voltage of the battery 1276 or the current flow from the battery 1276. The battery parameters may be used to determine actions that the edge computing node 1250 may perform, such as transmission frequency, mesh network operation, sensing frequency, and the like.

A power block 1280, or other power supply coupled to a grid, may be coupled with the battery monitor/charger 1278 to charge the battery 1276. In some examples, the power block 1280 may be replaced with a wireless power receiver to obtain the power wirelessly, for example, through a loop antenna in the edge computing node 1250. A wireless battery charging circuit, such as an LTC4020 chip from Linear Technologies of Milpitas, California, among others, may be included in the battery monitor/charger 1278. The specific charging circuits may be selected based on the size of the battery 1276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1258 may include instructions 1282 in the form of software, firmware, or hardware commands to implement the techniques described herein. Although such instructions 1282 are shown as code blocks included in the memory 1254 and the storage 1258, it may be understood that any of the code blocks may be replaced with hardwired circuits, for example, built into an application specific integrated circuit (ASIC).

In an example, the instructions 1282 provided via the memory 1254, the storage 1258, or the processor 1252 may be embodied as a non-transitory, machine-readable medium 1260 including code to direct the processor 1252 to perform electronic operations in the edge computing node 1250. The processor 1252 may access the non-transitory, machine-readable medium 1260 over the interconnect 1256. For instance, the non-transitory, machine-readable medium 1260 may be embodied by devices described for the storage 1258 or may include specific storage units such as optical disks, flash drives, or any number of other hardware devices. The non-transitory, machine-readable medium 1260 may include instructions to direct the processor 1252 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 1282 on the processor 1252 (separately, or in combination with the instructions 1282 of the machine readable medium 1260) may configure execution or operation of a trusted execution environment (TEE) 1290. In an example, the TEE 1290 operates as a protected area accessible to the processor 1252 for secure execution of instructions and secure access to data. Various implementations of the TEE 1290, and an accompanying secure area in the processor 1252 or the memory 1254 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the device 1250 through the TEE 1290 and the processor 1252.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The machine executable instructions of FIGS. 9 and/or 10 may be stored in the machine readable medium 1260 and/or on a removable non-transitory computer readable storage medium such as a CD or DVD.

Figure 13:
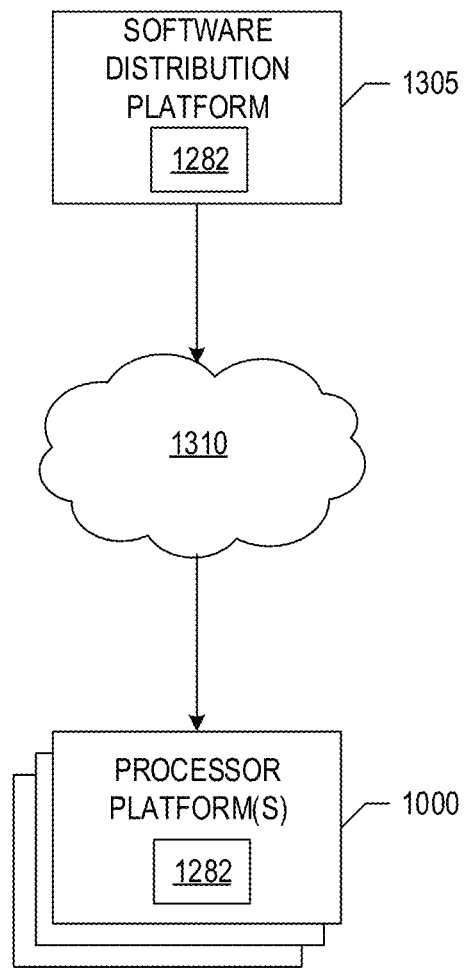
FIG. 13 is a block diagram of an example software distribution platform to distribute software (e.g., software corresponding to the example computer readable instructions of FIGS. 9 and/or 10) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1305 to distribute software such as the example computer readable instructions 1282 of FIG. 12 to third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1282 of FIG. 12. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the computer readable instructions 1282, which may correspond to the example computer readable instructions 1282 of FIG. 12, as described above. The one or more servers of the example software distribution platform 1305 are in communication with a network 1310, which may correspond to any one or more of the Internet and/or any of the example networks 1290 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1282 from the software distribution platform 1305. For example, the software, which may correspond to the example computer readable instructions 1282 of FIG. 12, may be downloaded to the example processor platform 1250, which is to execute the computer readable instructions to implement the example edge node 800. In some examples, one or more servers of the software distribution platform 1305 periodically offer, transmit, and/or force updates to the software (e.g., the example computer readable instructions 1282 of FIG. 12) to ensure improvements, patches, updates, etc. are distributed and applied to the software at the end user devices.

From the foregoing, it will be appreciated that example methods, apparatus and articles of manufacture have been disclosed that enable re-use of containers deployed on edge devices. Such re-use reduces overhead associated with deleting and initializing containers at the edge device. The disclosed methods, apparatus and articles of manufacture improve the efficiency of using a computing device by reducing the amount of resources required for deleting and creating (e.g., initializing) containers. The disclosed methods, apparatus and articles of manufacture are accordingly directed to one or more improvement(s) in the functioning of a computer.

Example methods, apparatus, systems, and articles of manufacture for re-use of a container in an edge computing environment are disclosed herein. Further examples and combinations thereof include the following:

Example 1 includes an apparatus for re-use of containers, the apparatus comprising memory including machine-readable instructions, at least one processor to execute the machine readable instructions to at least detect that a container executed at an edge node of a cloud computing environment is to be cleaned, delete user data from the container, the deletion of the user data performed without deleting the container from the memory of the edge node, restore settings of the container to a default state, and store information identifying the container, the information including a flavor of the container, the storing of the information to enable the container to be re-used by a subsequent requestor.

Example 2 includes the apparatus of example 1, wherein the processor is further to, in response to detection of a subsequent request to access the container identify the container based on a flavor identifier included in the subsequent request, and provide access to the container.

Example 3 includes the apparatus of example 2, wherein the processor is further to, in response to the subsequent request requesting identity validation of the container, generate a proof of identity of the container.

Example 4 includes the apparatus of example 2, wherein the processor is further to, in response to the subsequent request requesting validation of the data stored in the container, validate the data stored in the container.

Example 5 includes the apparatus of any one of examples 1 through 4, wherein the processor is further to detect that the container is to be cleaned in response to an indication that use of the container is complete.

Example 6 includes the apparatus of any one of examples 1 through 4, wherein the processor is further to detect that the container is to be cleaned in response to a threshold amount of time since the container was last used having elapsed.

Example 7 includes at least one non-transitory computer readable storage medium comprising instructions that, when executed, cause at least one processor to at least detect that a container executed at an edge node of a cloud computing environment is to be cleaned, delete user data from the container, the deletion of the user data performed without deleting the container from a memory of the edge node, restore settings of the container to a default state, and store information identifying the container, the information including a flavor of the container, the storing of the information to enable the container to be re-used by a subsequent requestor.

Example 8 includes the at least one non-transitory computer readable storage medium of example 7, wherein the processor is further to, in response to detection of a subsequent request to access the container identify the container based on a flavor identifier included in the subsequent request, and provide access to the container.

Example 9 includes the at least one non-transitory computer readable storage medium of example 8, wherein the processor is further to, in response to the subsequent request requesting identity validation of the container, generate a proof of identity of the container.

Example 10 includes the at least one non-transitory computer readable storage medium of example 8, wherein the processor is further to, in response to the subsequent request requesting validation of the data stored in the container, validate the data stored in the container.

Example 11 includes the at least one non-transitory computer readable storage medium of any one of examples 7 through 10, wherein the processor is further to detect that the container is to be cleaned in response to an indication that use of the container is complete.

Example 12 includes the at least one non-transitory computer readable storage medium of any one of examples 7 through 10, wherein the processor is further to detect that the container is to be cleaned in response to a threshold amount of time since the container was last used having elapsed.

Example 13 includes a method for re-use of containers, the method comprising detecting that a container executed at an edge node of a cloud computing environment is to be cleaned, deleting user data from the container, the deletion of the user data performed without deleting the container from a memory of the edge node, restoring settings of the container to a default state, and storing information identifying the container, the information including a flavor of the container, the storing of the information to enable the container to be re-used by a subsequent requestor.

Example 14 includes the method of example 13, further including, in response to detection of a subsequent request to access the container identifying the container based on a flavor identifier included in the subsequent request, and providing access to the container.

Example 15 includes the method of example 14, further including, in response to the subsequent request requesting identity validation of the container, generating a proof of identity of the container.

Example 16 includes the method of example 14, further including, in response to the subsequent request requesting validation of the data stored in the container, validating the data stored in the container.

Example 17 includes the method of any one of examples 13 through 16, wherein the detecting that the container is to be cleaned is performed in response to an indication that use of the container is complete.

Example 18 includes the method of any one of examples 13 through 16, wherein the detecting that the container is to be cleaned is performed in response to a threshold amount of time since the container was last used having elapsed.

Example 19 includes an apparatus for re-use of containers, the apparatus comprising means for detecting that a container executed at an edge node of a cloud computing environment is to be cleaned, and means for cleaning to delete user data from the container, the deletion of the user data performed without deleting the container from a memory of the edge node, the means for cleaning to restore settings of the container to a default state, the means for cleaning to store information identifying the container, the information including a flavor of the container, the storing of the information to enable the container to be re-used by a subsequent requestor. In some examples, the means for detecting is implemented by the container controller. In some examples, the means for cleaning is implemented by the container cleaner.

Example 20 includes the apparatus of example 19, wherein the means for detecting is further to, in response to detection of a subsequent request to access the container identify the container based on a flavor identifier included in the subsequent request, and provide access to the container.

Example 21 includes the apparatus of example 20, further including means for attesting to, in response to the subsequent request requesting identity validation of the container, generate a proof of identity of the container. In some examples, the means for attesting is implemented by the example attester.

Example 22 includes the apparatus of example 20, further including means for attesting to, in response to the subsequent request requesting validation of the data stored in the container, validate the data stored in the container. In some examples, the means for attesting is implemented by the example attester.

Example 23 includes the apparatus of any one of examples 19 through 22, wherein the means for detecting is to detect that the container is to be cleaned in response to an indication that use of the container is complete.

Example 24 includes the apparatus of any one of examples 19 through 22, wherein the means for detecting is to detect that the container is to be cleaned in response to a threshold amount of time since the container was last used having elapsed.

Example 25 is an edge computing gateway, comprising processing circuitry to perform any of Examples 1-24.

Example 26 is a base station, comprising a network interface card and processing circuitry to perform any of Examples 1-24.

Example 27 is a computer-readable medium comprising instructions to perform any of Examples 1-24.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for re-use of containers, the apparatus comprising:
    memory including machine-readable instructions;
    at least one processor to execute the machine readable instructions to at least:
        detect that a container executed at an edge node of a cloud computing environment is to be cleaned;
        delete user data from the container, the deletion of the user data performed without deleting the container from the memory of the edge node;
        restore settings of the container to a default state; and
        store information identifying the container, the information including a flavor of the container, the storing of the information to enable the container to be re-used by a subsequent requestor.

2. The apparatus of claim 1, wherein the processor is further to, in response to detection of a subsequent request to access the container:
    identify the container based on a flavor identifier included in the subsequent request; and
    provide access to the container.

3. The apparatus of claim 2, wherein the processor is further to, in response to the subsequent request requesting identity validation of the container, generate a proof of identity of the container.

4. The apparatus of claim 2, wherein the processor is further to, in response to the subsequent request requesting validation of data stored in the container, validate the data stored in the container.

5. The apparatus of claim 1, wherein the processor is further to detect that the container is to be cleaned in response to an indication that use of the container is complete.

6. The apparatus of claim 1, wherein the processor is further to detect that the container is to be cleaned in response to a threshold amount of time since the container was last used having elapsed.

7. At least one non-transitory computer readable storage medium comprising instructions that, when executed, cause at least one processor to at least:
    detect that a container executed at an edge node of a cloud computing environment is to be cleaned;
    delete user data from the container, the deletion of the user data performed without deleting the container from a memory of the edge node;
    restore settings of the container to a default state; and
    store information identifying the container, the information including a configuration of the container, the storing of the information to enable the container to be re-used by a subsequent requestor.

8. The at least one non-transitory computer readable storage medium of claim 7, wherein the processor is further to, in response to detection of a subsequent request to access the container:
    identify the container based on a configuration identifier included in the subsequent request; and
    provide access to the container.

9. The at least one non-transitory computer readable storage medium of claim 8, wherein the processor is further to, in response to the subsequent request requesting identity validation of the container, generate a proof of identity of the container.

10. The at least one non-transitory computer readable storage medium of claim 8, wherein the processor is further to, in response to the subsequent request requesting validation of the data stored in the container, validate data stored in the container.

11. The at least one non-transitory computer readable storage medium of claim 7, wherein the processor is further to detect that the container is to be cleaned in response to an indication that use of the container is complete.

12. The at least one non-transitory computer readable storage medium of claim 7, wherein the processor is further to detect that the container is to be cleaned in response to a threshold amount of time since the container was last used having elapsed.

13. A method for re-use of containers, the method comprising:
    detecting that a container executed at an edge node of a cloud computing environment is to be cleaned;
    deleting user data from the container, the deletion of the user data performed without deleting the container from a memory of the edge node;
    restoring settings of the container to a default state; and
    storing information identifying the container, the information including a flavor of the container, the storing of the information to enable the container to be re-used by a subsequent requestor.

14. The method of claim 13, further including, in response to detection of a subsequent request to access the container:
   identifying the container based on a flavor identifier included in the subsequent request; and
   providing access to the container.

15. The method of claim 14, further including, in response to the subsequent request requesting identity validation of the container, generating a proof of identity of the container.

16. The method of claim 14, further including, in response to the subsequent request requesting validation of data stored in the container, validating the data stored in the container.

17. The method of claim 13, wherein the detecting that the container is to be cleaned is performed in response to an indication that use of the container is complete.

18. The method of claim 13, wherein the detecting that the container is to be cleaned is performed in response to a threshold amount of time since the container was last used having elapsed.

19. An apparatus for re-use of containers, the apparatus comprising:
   means for detecting that a container executed at an edge node of a cloud computing environment is to be cleaned; and
   means for cleaning to delete user data from the container, the deletion of the user data performed without deleting the container from a memory of the edge node, the means for cleaning to restore settings of the container to a default state, the means for cleaning to store information identifying the container, the information including a flavor of the container, the storing of the information to enable the container to be re-used by a subsequent requestor.

20. The apparatus of claim 19, wherein the means for detecting is further to, in response to detection of a subsequent request to access the container:
   identify the container based on a flavor identifier included in the subsequent request; and
   provide access to the container.

21. The apparatus of claim 20, further including means for attesting to, in response to the subsequent request requesting identity validation of the container, generate a proof of identity of the container.

22. The apparatus of claim 20, further including means for attesting to, in response to the subsequent request requesting validation of data stored in the container, validate the data stored in the container.

23. The apparatus of claim 19, wherein the means for detecting is to detect that the container is to be cleaned in response to an indication that use of the container is complete.

24. The apparatus of claim 19, wherein the means for detecting is to detect that the container is to be cleaned in response to a threshold amount of time since the container was last used having elapsed.

* * * * *